(12) United States Patent
Arnaud et al.

(10) Patent No.: US 6,872,453 B2
(45) Date of Patent: Mar. 29, 2005

(54) GLAZING COATED WITH AT LEAST ONE LAYER HAVING THERMOCHROMIC PROPERTIES

(75) Inventors: Alain Arnaud, Versailles (FR); Fabien Beteille, Paris (FR); Jean-Christophe Giron, Paris (FR); Francois Lerbet, Beaulieu les Annonay (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/347,495

(22) Filed: Jan. 21, 2003

(65) Prior Publication Data

US 2004/0005472 A1 Jan. 8, 2004

Related U.S. Application Data

(63) Continuation of application No. 09/862,714, filed on May 23, 2001, now abandoned.

(30) Foreign Application Priority Data

May 23, 2000 (FR) ............................................. 00 06585

(51) Int. Cl.$^7$ ................................................. B32B 9/00
(52) U.S. Cl. .................. 428/432; 428/428; 428/448; 428/697; 428/698; 428/699; 428/701; 428/702; 428/704; 106/286.8; 204/192.1
(58) Field of Search ................................. 428/428, 432, 428/433, 434, 448, 697, 698, 699, 701, 702, 704; 106/286.8; 204/192.1

(56) References Cited

U.S. PATENT DOCUMENTS

| | | | | |
|---|---|---|---|---|
| 3,483,110 A | * | 12/1969 | Rozgonyi | 204/192.12 |
| 3,834,793 A | * | 9/1974 | McConnell et al. | 359/289 |
| 3,899,449 A | | 8/1975 | Pukaite | |
| 4,393,095 A | * | 7/1983 | Greenberg | 65/60.52 |
| 4,401,690 A | * | 8/1983 | Greenberg | 65/60.52 |
| 4,960,323 A | * | 10/1990 | Demiryont | 359/275 |
| 5,506,037 A | * | 4/1996 | Termath | 428/216 |
| 5,822,107 A | | 10/1998 | Lefrou et al. | |
| 5,838,482 A | | 11/1998 | Decroupet et al. | |
| 5,888,431 A | | 3/1999 | Tonar et al. | |
| 5,985,486 A | | 11/1999 | Giron | |
| 6,055,088 A | * | 4/2000 | Fix et al. | 359/265 |
| 6,103,363 A | | 8/2000 | Boire et al. | |
| 6,218,018 B1 | | 4/2001 | McKown et al. | |
| 6,277,523 B1 | | 8/2001 | Giron | |
| 6,337,758 B1 | | 1/2002 | Beteille et al. | |
| 6,352,754 B1 | | 3/2002 | Frost et al. | |
| 6,358,307 B1 | * | 3/2002 | Legrand et al. | 106/479 |
| 6,440,592 B1 | * | 8/2002 | Meyer et al. | 428/701 |
| 6,540,884 B1 | * | 4/2003 | Siddle et al. | 204/192.22 |

FOREIGN PATENT DOCUMENTS

| | | | |
|---|---|---|---|
| DE | 198 60 026 | | 12/1999 |
| EP | 0 847 965 | | 6/1998 |
| GB | 2 114 965 | | 9/1983 |
| JP | 2000-137251 | * | 5/2000 |
| WO | WO 98/12583 | | 3/1998 |
| WO | WO 99/62836 | * | 12/1999 |

OTHER PUBLICATIONS

Patent Abstract of Japan vol. 2000, No. 8, Oct. 6, 2000, JP 2000 137251, May 16, 2000.

* cited by examiner

*Primary Examiner*—Deborah Jones
*Assistant Examiner*—G. Blackwell-Rudasill
(74) *Attorney, Agent, or Firm*—Oblon, Spivak, McClelland, Maier & Neustadt, P.C.

(57) ABSTRACT

A glazing coated with at least one layer having thermochromic properties comprising vanadium oxide, and also with at least one other layer having thermal properties, such as an infrared reflecting layer, and/or at least one other layer having optical properties, such as antireflection in the visible, and/or electrical conduction properties; and having a particular application for making solar control glazing.

38 Claims, No Drawings

GLAZING COATED WITH AT LEAST ONE LAYER HAVING THERMOCHROMIC PROPERTIES

BACKGROUND OF THE INVENTION

1. Field of the Invention

The present invention relates to glazing in the broad sense of the term (any substantially transparent substrate or assembly of substrates) which is provided with thin layers having thermochromic properties.

The invention relates more particularly to thermochromic layers based on vanadium oxide.

2. Description of the Background

Vanadium oxide has already been much studied. It is a material which, as the temperature rises, switches at a temperature of about 70° C. from electrically insulating behaviour to electrically conducting behaviour due to a crystallographic distortion. This change in its electrical properties is accompanied by a change in its optical properties, essentially in the infrared (when the temperature of the layer exceeds the switch temperature, the layer becomes reflecting and absorbent in the infrared). This is one of the rare thermochromic compounds known to have such a transition at a temperature relatively close to room temperature, hence the interest that it has aroused in the production of glazing which can, for example, filter out solar radiation in hot weather.

To lower the switch temperature of vanadium oxide to temperatures of about 25 to 55° C., a more appropriate temperature range for such a role, it has been proposed, for example in U.S. Pat. No. 4,401,690, to incorporate into it a dopant such as niobium, tantalum, molybdenum, iridium or tungsten. It has also been proposed, in Patent Application WO99/62836, to incorporate both tungsten and fluorine into the vanadium oxide.

However, when this material is used by itself, in a thin layer, there are not many possible ways to modulate jointly its optical and thermal, or even electrical, properties, depending on whether the temperature is above or below its switch temperature.

It is therefore an object of the invention to provide greater flexibility in the various properties of this thermochromic material, especially so as to be able to give glazing which has been provided therewith more modifiable functionalities or even novel functionalities.

SUMMARY OF THE INVENTION

The invention is a glazing which is coated with at least one layer having thermochromic properties and comprising vanadium oxide, which can be substoichiometric in terms of oxygen, and at least one other layer having thermal properties, preferably at least partially reflecting in the infrared, and/or at least one other layer having optical properties, preferably antireflection properties in the visible, and/or at least one other layer having electrical conduction properties.

DETAILED DESCRIPTION OF THE INVENTION

Within the meaning of the invention, the term "glazing" as used herein is to be understood in its broadest sense, namely any essentially transparent substrate or assembly of substrates, examples of which will be explained in detail below and which may be of an inorganic nature (glass) or organic nature (polymer). Such glazing may be rigid (glass or polycarbonate), semi-rigid or flexible (polyethylene terephthalate, polyvinyl chloride, etc.). In general, the glazing in question comprises at least one rigid or semi-rigid substrate. It may also be incomplete glazing, or glazing not yet assembled, and in this case it may comprise only one or more flexible substrates.

Within the meaning of the invention, the term "vanadium oxide" as used herein is understood to mean one of the oxides of this metal which has thermochromic properties, namely, essentially vanadium dioxide $VO_2$. Similarly, "substoichiometric in terms of oxygen" is understood to mean an oxide of vanadium having the formula $VO_x$, where $x<2$. This encompasses homogeneous structures (in which the layer is in a suboxidized state) or heterogeneous structures (in which the layer has a heterogeneous structure, with phases oxidized to a greater or lesser extent, such as containing vanadium inserts still in metallic form, as will be described in detail below).

Within the meaning of the invention, each of the three types of layer that can be associated with the thermochromic layers and which are described above (thermal function, electrical conduction function and optical function) may in fact simultaneously fulfill at least two of these functions: a conducting layer, for example based on a metal oxide, may also, given a suitable thickness and a suitable refractive index, have an optical function, especially that of reducing the glazing's reflection in the visible.

It is also possible to exploit the electrical conduction properties of an infrared-reflecting layer.

The invention has therefore developed an association, on the same glazing, of two very different types of layer, the properties of which can be combined to give very novel results. If the vanadium oxide layer is combined with one or more layers having thermal properties, the association comprises:

on the one hand, a thermochromic layer—the "active" layer—whose properties have two states depending on the operating temperature, but for which layer there is little room to maneuver in order to establish compromises, especially between thermal and optical properties; and on the other hand, a reflecting layer, or "passive" layer in that its properties remain substantially unchanged over the temperatures envisaged (normal outdoor temperatures throughout the year), which layer can interact, especially interferentially when the layers are within the same multilayer film, with the thermochromic layer in order to increase the number of possible variations in the properties conferred on the carrier glazing.

Advantageously, the abovementioned layer or layers having thermal properties (the "passive" layers within the meaning of the invention) may, in a first variant, be based on a metal or a metal alloy chosen from one or more of the following metals: gold (Au), silver (Ag), nickel (Ni) and chromium (Cr), or alloys such as steel or Inconel. The metals or metal alloys may, moreover, be partially nitrified, especially in the case of nickel and chromium. The preferred embodiment is silver—a selective metal—which offers a good compromise between optical properties (light transmission) and thermal properties (reflection in the infrared).

According to a second variant, the layer or layers having thermal properties is or are based on one or more metal nitrides chosen from at least one of the following nitrides:

titanium nitride (TiN), chromium nitride (CrN), niobium nitride (NbN) and zirconium nitride (ZrN).

Advantageously, the layer or layers based on vanadium oxide—the "active" layers within the meaning of the invention—is or are modified so as to lower their switch temperature $T_s$ to a value below 60° C. or below 50° C. or 45° C., for example down to a range of values lying between 25° C. and 40° C.

The modification, as is known from the above-described prior art, may be chemical, by adding a "dopant", especially a metal chosen from titanium (Ti), niobium (Nb), molybdenum (Mo), iridium (Ir) and tungsten (W). The dopant may also be chosen from halogens, especially fluorine. It is possible to use several dopants. In general, the amount of dopant in the layer is between 0.1 and 10 at % with respect to vanadium.

The modification may also be physical in nature, for example, by adjusting the deposition parameters for depositing the layer.

This (chemical or physical) modification will therefore lower the temperature at which the vanadium oxide completely fulfills its role of solar control layer, by making it effective as soon as the temperature reaches, for example, 25° C., 30° C., 50° C. or 60° C. It also has another consequence which, unexpectedly, proves to be attractive for the glazing user: it makes the switching of the layer visible, especially by appreciably increasing the light reflection when the switch temperature is exceeded. The user can then appreciate the change in functionality of the layer with his own eyes.

The layer or layers based on vanadium oxide must be at least partially crystallized in order to have the desired thermochromic properties. This crystallization may be obtained during deposition of the layer or by a treatment after the deposition process. This treatment, during or after deposition, may comprise a heat treatment or a bombardment with a suitable ion beam.

Thus, it is possible to use the technique of deposition by sputtering, especially magnetic-field enhanced reactive sputtering, using a vanadium target, possibly "doped" within the meaning of the invention, and in the presence of oxygen. To obtain the desired stoichiometry—that corresponding to the thermochromic crystalline phase—the amount of oxygen with respect to the inert gases, such as Ar, in the deposition chamber may be finely adjusted. It is also possible to start with a vanadium oxide target, especially in the form $VO_x$ where x is between 1.5 and 2.5.

To obtain the required degree of crystallization, a heat treatment may be carried out on the substrate before, during or after deposition of the layer. This heat treatment may or may not be carried out in a vacuum when it precedes or follows the deposition. The ion bombardment treatment may also be carried out during deposition of the layer or after deposition. Another way of promoting the crystallization involves providing the layer with a suitable nucleation sublayer. This allows the temperature of the heat treatment required for crystallization to be lowered. The sublayer may also act as a barrier layer with respect to species migrating from the materials adjacent to the layer, most particularly alkali metal ions migrating from glass substrates, or even have an optical function.

These sublayers, whether they fulfill one or both of these functions, may be made of silicon derivatives for example, especially silicon oxide ($SiO_x$) ($0<x\leq 2$), silicon oxynitride (SiON) or silicon oxycarbide (SiOC). They may also be based on silicon nitride (possibly containing a minority metal of the Al type) or based on zinc oxide (ZnO).

The thermochromic layer or at least one of the thermochromic layers may be based on vanadium oxide which is generally substoichiometric in terms of oxygen, especially with a formula of the $VO_x$ type in which x<2 and especially between 1.50 and 1.95. The layer may be homogeneous in its composition and be suboxide. It may also be heterogeneous, with phases rich in vanadium oxide and phases lean in oxidized vanadium, that is to say, phases in which the vanadium is in metallic or quasi-metallic form. It then has a structure of the cermet type, that is to say a structure comprising a ceramic (vanadium oxide, whether stoichiometric, substoichiometric or superstoichiometric with respect to oxygen) matrix with metallic (vanadium metal) inserts. The advantage of this type of structure is that it is then possible to have a bifunctional layer: on the one hand, it is thermochromic as it contains vanadium oxide having this property and, on the other hand, it has thermal properties, especially infrared reflection properties, because of the presence of vanadium metal (having properties similar to silver). Consequently, there is no longer any need to add to the layer an Ag-type reflecting layer. Thus, the invention is also glazing provided with such an overall oxygen substoichiometric thermochromic layer, a layer having a cermet-type structure, independently of any association with layers having functionalities other than a thermochromic functionality (a layer with an optical role, thermal role, electrical role, etc.).

The thickness of the layer or layers based on vanadium oxide is chosen so as to take into account various parameters: when it is used by itself, it is generally necessary to find the most acceptable compromise according to the application envisaged for the glazing. This as because vanadium oxide is absorbent and quite colored in the visible (a pronounced "bronze" color) and it is generally sought to have the highest possible contrast in terms of energy transmission $T_E$, whereas the coloration in the visible and the energy transmission are increasing functions of the layer thickness.

According to the invention, it is associated with the other type of layers and its thickness is therefore to be chosen according to that layer when interferential interaction between the said layers is desired. Usually, the layers based on vanadium oxide according to the invention have a thickness of between 10 nm and 300 nm, preferably between 30 nm and 100 nm.

According to a preferred variant of the invention, the layer(s) based on vanadium oxide and the layer(s) having thermal or optical properties form part of the same multilayer film of thin layers deposited on the same face of the constituent substrate or of one of the constituent substrates of the glazing. It is, of course, in this configuration that it is possible to obtain glazing with the most novel properties, by interferential interaction between the two types of layers. Preferably, they have a common interface. (Alternatively, one or more thin interlayers may be interposed between them).

The type of multilayer film capable of incorporating these two types of layers may be similar to the multilayer films with thermal properties already existing on the market or at the very least in the literature. Thus, low-emissivity or solar-protection multilayer films with the following configuration are known:

dielectric/functional layer/dielectric.

More selective multilayer films repeat this sequence in order to obtain configurations of the following type:

dielectric/functional layer/dielectric/functional layer/dielectric with the functional layers being made, for example, of silver and the dielectrics (D) being in the form of layers or multilayer films based on a material of the metal-oxide type, on silicon oxide derivatives or on nitrides, such as AlN or $Si_3N_4$.

Thus, there are known multilayer films of the following type:

D1/Ag/D2 or D1/Ag/D2/Ag/D3 bearing in mind that at the interfaces between the silver (Ag) layers and the dielectric (D) layers there may be thin layers having a sacrificial function, nucleation function, etc. Reference may be made, for example, to the disclosure of the patents EP-628 528, EP-678 484, EP-718 250, EP-844 219 or EP-847 965 for further details about the nature of the layers, their thicknesses and their method of deposition.

By therefore adopting this type of multilayer film, it is possible, according to the present invention, to substitute at least one of the constituent layers of the dielectrics with the vanadium-based thermochromic layer. One of the dielectrics may thus be completely replaced with the vanadium oxide layer, or be in the form of a multilayer associating one or more conventional dielectric layers with a thermochromic vanadium oxide layer.

In the specific case of the multilayer films using two layers having thermal properties, especially two silver layers, it is preferable that it is the dielectric D2—the one which lies against the two layers—which is thus completely or partially replaced.

The abovementioned conventional dielectrics may be chosen from $ZnO$, $TiO_2$, $SnO_2$, $Nb_2O_5$, $Ta_2O_5$, AlN, $Si_3N_4$, SiAlN, SiON, SiOC, $SiO_2$, or a mixture of at least two of these materials.

The aforementioned multilayer films, using two silver layers and at least one vanadium oxide layer, are truly remarkable: they may give the glazing exceptional solar-protection properties when the weather starts to be hot, when the vanadium oxide switches to a metallic state. Furthermore, this switching from the thermal standpoint can be seen by the user, giving it an additional aesthetic aspect. It may thus provide enhanced visual comfort, within a building or a vehicle fitted with such glazing, by allowing the light to be screened in the event of strong sunshine.

Another variant of the invention involves depositing the layer(s) based on vanadium oxide and the layer(s) having thermal properties on both faces of the same constituent substrate of the glazing, or on one face of a first constituent substrate and on one face of a second constituent substrate of the said glazing. It is therefore possible to associate two types of layers in their known configurations on the same glazing (on one side, for example the vanadium oxide layer possibly associated with a nucleation sublayer/protective overlayer, and on the other side a multilayer film having one or two functional layers as described above). This simplifies the construction of the glazing, but limits the overall performance of the glazing by limiting the possible interferential interactions between the two types of layers.

According to one embodiment of the invention, as described above, it is possible to associate the thermochromic layer or layers with one or more electrically conducting layers. These conducting layers may be made of a metal or a metal nitride, of the same type as the above-described infrared-reflecting layers. However, it is preferable to choose layers based on a transparent conducting oxide of the doped indium oxide, especially tin-doped indium oxide (ITO), doped (especially Al-doped) zinc oxide or doped (especially fluorine-doped or antimony-doped) tin oxide type.

The main aim of such a layer is to be able to cause the thermochromic layer or layers to switch by heating using these conducting layers provided with suitable means of connection to a supply of electricity. The conducting layer heats up by resistance heating when it is supplied with electricity, and it transmits this heat to the thermochromatic layer in order to make it switch to its reflecting/absorbent state when required. Many variants are possible. It is possible to adjust the level of electrical conductivity at the conducting layer (chemical nature, type of doping, thickness, etc.), according to the type of thermochromic layer used (switch temperature raised or lowered by doping, etc.) and according to the respective positions of the conducting layer and the thermochromic layer. As an example, it is possible to use metal layers, such as Ag layers, having a thickness ranging from 5 to 50 nm, especially 8 to 30 nm. An ITO layer may have a thickness ranging from 50 to 500 nm, especially 100 to 300 nm.

Thus, the two types of layers are preferably located either on the same face of the substrate or of one of the constituent substrates, or on the opposed faces of the said substrate. This is because when the envisaged substrates are made of glass, it is preferable for there to be only at most one thickness of glass separating the conducting layer from the thermochromic layer (preferably a relatively thin glass sheet, for example at most 2 or 3 mm in thickness).

The electrical supply should be chosen according to all these parameters: the type of connection system used for the conducting layer may comprise two metal shims deposited along two opposed sides of the conducting layer, as may be known in the case of heating layers for antifogging or defrosting applications, with which, for example, motor vehicle or aircraft windows are fitted. It is possible to chose a voltage supply or a current supply, with a signal initiating the switching of the electrochromic layer, which may be a square-wave signal, or to provide an increasing voltage rise, for example, an exponential rise.

Thus, it is possible to switch the thermochromic layer in two ways:

spontaneously, by the heating produced by solar radiation, for example;

and/or by electrical control.

The electrical supply may be regulated by any electronic/computing means. If the vanadium oxide is not modified/doped and its switch temperature is high, this possibly regulated electrical control may thus make it possible to obtain switching at a lower ambient temperature, for example, around 30 or 40° C. The association of a thermochromic layer with a conducting layer capable of being supplied with electricity therefore gives greater control of the switching state of the thermochromic layer, and greater flexibility.

The simplest configuration is to have a sequence of the following type:

(1)—conducting layer/substrate/thermochromic layer (2)—substrate/conducting layer/thermochromic layer (3)—substrate/thermochromic layer/conducting layer.

Optionally, it is possible to insert, between the substrate (if it is made of glass) and the conducting layer, a barrier layer of the $SiO_2$ or SiOC type, which is a barrier to alkali metals, in configurations (1) and (2).

Optionally, in configuration (3), it is possible to provide a barrier layer between the substrate (if it is made of glass) and the thermochromic layer.

Optionally, in configurations (2) and (3), it is possible to provide a thin barrier layer, for example made of a metal oxide of the $SnO_2$ type, between the conducting layer and the thermochromic layer, particularly when the conducting layer is based on a doped oxide, such as ITO.

These configurations may also include other layers, especially those having an optical function (on or under the thermochromic layer, on or under the conducting layer, between the two layers when they are superposed, etc.).

The glazing according to the invention preferably comprises one or more rigid or semi-rigid substrates made of glass or of a polymer material of the polycarbonate (PC), polyvinyl chloride (PVC) or polymethyl methacrylate (PMMA) type.

It may be "monolithic" glazing (a single substrate). It may also be laminated glazing or insulating multiple glazing of the double-glazing or triple-glazing type. The glazing may include at least one curved and/or toughened glass pane.

The glazing according to the invention may have pronounced solar control properties, especially with a reduction in their energy transmission $\Delta T_E$ of at least 5%, a reduction in their light transmission $\Delta T_L$ of at least 5% and an increase in their light reflection $\Delta R_L$ of at least 10% when they pass from a temperature below the switch temperature of the vanadium-oxide-based layers to a temperature above it.

The invention also provides solar control glazing whose thermal/optical behaviour is different, for example, depending on the season or the time of day.

According to another embodiment, the invention provides glazing using at least one dielectric layer intended to anti-reflect the vanadium oxide layer in the visible. The dielectric layer or layers are chosen by suitably selecting their refractive indexes, their positions in the multilayer film and their thicknesses. They may, for example, be metal oxides such as $TiO_2$, $SnO_2$, $Ta_2O_5$, $Nb_2O_5$, ZnO and/or silicon derivatives such as SiOC, $SiO_2$, $Si_3N_4$, SiON and/or AlN.

As described above, it is preferable for all the thin layers with which the glazing according to the invention is provided to be vacuum deposited, especially by sputtering (at least the layers based on a vanadium oxide and advantageously the other layers too). The conducting layers based on a doped oxide, especially $F:SnO_2$, may also advantageously be deposited by pyrolysis, especially by CVD or powder pyrolysis, in a known manner.

Having generally described this invention, a further understanding can be obtained by reference to certain specific examples which are provided herein for purposes of illustration only and are not intended to be limiting unless otherwise specified.

The examples which follow use layers deposited on 2 mm thick clear silica-soda-lime glass by sputtering. (These results are obtained by mathematical modeling).

The following Examples 1 to 3b, relate to the first embodiment of the invention, associating a vanadium oxide layer with multilayer films comprising two silver layers.

EXAMPLE 1

The thin multilayer film is as follows:
glass/dielectric (1)/Ag/$VO_2$/Ag/dielectric (3) 40 nm-2.0 index 10 nm 40 nm 10 nm 40 nm-2.0 index
The $VO_2$ is not doped.

EXAMPLE 1a

The multilayer film is identical to Example 1, but the $VO_2$ layer in this case is 60 nm thick.

EXAMPLE 2

The thin multilayer film is as follows:
glass/dielectric (1)/Ag/$VO_2$'/Ag/dielectric (3) 40 nm-2.0 index 16 nm 40 nm 16 nm 40 nm-2.0 index
The "$VO_2$'" here is $VO_2$ modified with a level of fluorine such that its switch temperature is lowered to about 30° C.

EXAMPLE 3

The thin multilayer film is as follows:
glass/dielectric (1)/Ag/$VO_2$'/Ag/dielectric(3) 20 nm-$TiO_2$-2.45 index 16 nm 40 nm 16 nm 20 nm-2.0 index
The "$VO_2$'" is identical to that in Example 2.

EXAMPLE 3a

Example 3a is identical to Example 3, except that the silver layers each have a thickness of 15 nm.

EXAMPLE 3b

Example 3b is identical to Example 3, except that the silver layers each have a thickness of 14 nm.

The five coated glass panes were then mounted in a double-glazing configuration, with a second glass pane uncoated, made of clear silica-soda-lime glass 2 mm in thickness, and a gas layer of 12 mm thickness between the two glass panes.

The photometric measurements detailed in Table 1 below were taken on the side coated with the layers. Provision is made for the layers to be on the 2 face once the double glazing has been fitted into the building (or the vehicle). (Conventionally, the faces of the glass panes of the glazing are numbered starting from the outermost face.)

$T_L$ means the light transmission, in %, using the $D_{65}$, illuminant:

Cold/hot means the color of the parameter in question, depending on whether the temperature is above or below the switch temperature of the vanadium-oxide-based layers;

$T_E$ means the energy transmission, in %;

$R_L$ means the light reflection, in %;

$P_a$ means the color purity in transmission, in %;

$\lambda_d$ means the dominant wavelength of the color in transmission, in nm.

TABLE 1

| Example | 1 | 1a | 2 | 3 | 3a | 3b |
|---|---|---|---|---|---|---|
| $T_L$ (cold/hot) | 32.4/ 28.8 | 24.7/ 21.7 | 26.3/ 14.6 | 21.6/ 11.4 | 24.4/ 13.3 | 26.2/ 15.4 |
| $\lambda_d$ (cold/hot) | 576/563 | 577/567 | 526/483 | 499/480 | 508/481 | 529/482 |
| $P_c$ (cold/hot) | 29/20 | 41/32 | 5/25 | 7.6/34 | 4.9/34 | 4.5/27 |
| $T_E$ (cold/hot) | 22/15 | 19/11 | 13/8 | 10.6/ 6.5 | 12.2/ 7.5 | 14/8.6 |
| $R_L$ (cold/hot) | 22/25 | 24/25 | 31/46 | 22/38 | 18/34 | 15/30 |

From this data, it may be seen that there is an advantage in using such glazing to equip buildings: the combination of silver layers with vanadium oxide layers makes it possible to obtain $T_E$ switching contrasts from at least 5% up to 8%, associated with strong $T_L$ and $R_L$ switching contrasts.

By way of comparison with double glazing provided on the 2 face only with a 50 nm $VO_2$ layer, a $T_E$ (cold/hot) of 29.8 and 23.8%, respectively, a $T_L$ (cold/hot) of 30.7 and 29.9%, respectively, and an $R_L$ (cold/hot) of 31% and 28%, respectively, are obtained. There is clearly a contrast in $T_E$, but no contrast in $T_L$ and little contrast in $R_L$, with a much less pronounced solar-protection effect.

The glazing according to the invention has an $R_L$ value, especially with regard to Examples 2 to 3b, which varies considerably depending on the state, "cold" or "hot", of the glazing. The glazing therefore becomes much more reflecting as soon as it switches to its "hot" state, allowing the user to "see" when the glazing becomes more filtering from the thermal standpoint. This effect is attractive and novel.

A useful criterion involves considering the $T_L$ (cold)/$T_E$ (hot) ratio, when it is sought to have the highest possible light transmission at low temperatures and to have the lowest possible energy transmission at high temperatures. With a comparative example using a 50 nm $VO_2$ layer, this ratio is only 1.3, whereas this ratio is greater than or equal to 2 in the case of the examples according to the invention.

It may also be seen from these various examples that it is possible to adjust the parameter values in order to obtain the desired color, the desired $T_E$ level and the desired color intensity. Thus, it is possible to modify the thicknesses of the layers, to completely replace, or not, one of the dielectrics with $VO_2$, and to choose the dielectric with the most appropriate refractive index.

It should be emphasized that Examples 3a and 3b in particular have a color purity in transmission of less than 5% in the "cold" state. It is also possible in this state to have particularly neutral glazing with a low color intensity.

The invention has therefore made it possible to develop glazing which has a very high thermal adaptability and is optically attractive by varying the synergy between thermochromic layers and other layers. It allows the offering of summer/winter glazing by providing novel pairs of $T_L/T_E$ values in the "cold" state and in the "hot" state.

The invention is not limited to this specific combination, rather it also encompasses a combination of these thermochromic layers based on vanadium oxide with one or more layers having an essentially optical role. Thus, it is possible to associate thermochromic layers with overlayers and/or underlayers based on a dielectric having a suitable refractive index in order to improve/refine the optical performance.

Example 4 below thus relates to the second embodiment of the invention, associating the vanadium oxide layer with one or more dielectric layers intended for antireflection.

EXAMPLE 4

The multilayers film, on the same glass as in the previous examples, is as follows:

glass/$TIO_2$/$VO_2$/$SnO_2$ 130 nm 60 nm 50 nm

In double glazing with the layers on the 2 face in the same arrangement as in the previous examples, there is a $T_L$ contrast of 9.2% between the "hot" state and the "cold" state due to the $VO_2$ layer. However, $T_L$ levels higher than those obtained with just the $VO_2$ are obtained, namely 53.4% in the "cold" state and 50.9% in the "hot" state (instead of 31.0% in the "cold" state and 29.5% in the "hot" state for a 60 nm layer of $VO_2$ alone). The dielectric layers surrounding the $VO_2$ layer thus increase the $T_L$ by almost 20% in the "cold" and "hot" states by interferential interaction.

EXAMPLE 4a

The multilayer film, again on the same type of glass, is produced by substituting the $TiO_2$ first layer of Example 4 with a ZnO layer of suitable optical thickness (or any other layer having a refractive index of less than 2.45, especially between 1.90 and 2.30).

EXAMPLE 5

The multilayer film, again on the same type of glass, is produced by associating the $VO_2$-based layer with an ITO conducting layer. This is:

glass/ITO/$VO_2$ 60 nm

The ITO layer is provided with two copper shims and supplied by a voltage generator: its thickness and the voltage are adjusted so as to be able to switch the $VO_2$ into its absorbent state as required, even when the ambient temperature is below its switch temperature.

The disclosure of France priority application FR00/06585, filed May 23, 2000, is hereby incorporated by reference.

What is claimed is:

1. A glazing coated with (1) at least one at least partially crystallized layer having thermochromic properties and comprising vanadium oxide which is stoichiometric or sub-stoichiometric in terms of oxygen, and (2) at least one other layer selected from the group consisting of layers having thermal properties, optical properties, electrical conduction properties, and a combination of at least two of said properties, wherein at least one layer of the layers (1) comprising vanadium oxide comprises vanadium oxide which is substoichiometric in terms of oxygen, and wherein the said at least one layer contains a vanadium-rich phase in which the vanadium is in oxidized form and a vanadium-lean phase in which the vanadium is in metallic form, and has a cermet structure.

2. The glazing according to claim 1, wherein the layer(s) (2) has (have) thermal properties, and wherein said properties are infrared-reflecting properties.

3. The glazing according to claim 1, wherein the layer(s) (2) has (have) optical properties, and wherein said properties are antireflection properties in the visible wavelength range.

4. The glazing according to claim 1, wherein the layers (2) has (have) thermal properties, and said layers comprise at least one metal or metal alloy selected from the group consisting of gold, silver, nickel, chromium, steel, Inconel, wherein said metal or metal alloy is optionally partially nitrided.

5. The glazing according to claim 1, wherein the layer(s) (2) has (have) thermal properties, and said layer(s) comprise at least one metal nitride selected from the group consisting of titanium nitride, niobium nitride, zirconium nitride, and chromium nitride.

6. The glazing according to claim 1, wherein the layer(s) (1) comprising vanadium oxide is (are) modified so as to lower its (their) switch temperature $T_s$ to a value below 60° C.

7. The glazing according to claim 6, wherein the layer(s) (1) comprising vanadium oxide is (are) modified so as to lower its (their) switch temperature $T_s$ to a value below 45° C.

8. The glazing according to claim 7, wherein the layer(s) (1) comprising vanadium oxide is (are) modified so as to lower its (their) switch temperature $T_s$ to a value between 25° C. and 40° C.

9. The glazing according to claim 6, wherein the layer(s) (1) comprising vanadium oxide additionally contain at least one dopant selected from the group consisting of halogens and metals.

10. The glazing according to claim 9, wherein the layer(s) (1) comprising vanadium oxide additionally contain at least one dopant selected from the group consisting of fluorine, titanium, niobium, molybdenum, iridium, and tungsten.

11. The glazing according to claim 1, wherein the layer(s) (1) comprising vanadium oxide is (are) crystallized at least partially by a heat treatment or an ion bombardment.

12. The glazing according to claim 1, wherein said vanadium oxide which is substoichiometric in terms of oxygen has a formula $VO_x$ where x<2.

13. The glazing according to claim 12, wherein x is between 1.54 and 1.95.

14. The glazing according to claim 1, wherein at least one layer of the layer(s) (1) comprising vanadium oxide is provided with a nucleation sublayer and/or a sublayer acting as a barrier to alkali metals.

15. The glazing according to claim 14, wherein the sublayer comprises $SiO_2$, SiON, SiOC, silicon nitride or zinc oxide.

16. The glazing according to claim 1, wherein the layer(s) (1) comprising vanadium oxide has (have) a thickness of between 10 nm and 300 nm.

17. The glazing according to claim 16, wherein the thickness is between 30 nm and 100 nm.

18. The glazing according to claim 1, which contains one or more substrates, and wherein the layer(s) (1) and layer(s) (2) form part of a thin multilayer film deposited on the same face of at least one of the substrates.

19. A glazing coated with (1) at least one at least partially crystallized layer having thermochromic properties and comprising vanadium oxide which is stoichiometric or substoichiometric in terms of oxygen, and (2) at least one other layer selected from the group consisting of layer(s) having thermal properties, optical properties, electrical conduction properties, and a combination of at least two of said properties.

which glazing contains one or more substrates, and wherein the layer(s) (1) and layer(s) (2) form part of a thin multilayer film deposited on the same face of at least one of the substrates, and wherein the multilayer film has a structure selected from the group consisting of $D_1/Ag/D_2$, and $D_1/Ag/D_2/Ag/D_3$, where $D_1$, $D_2$, and $D_3$ are each a layer or a superposition of layer(s) of dielectric, at least one of said layer(s) being replaced with the thermochromic layer comprising vanadium oxide.

20. The glazing according to claim 19, wherein the multilayer film has a $D_1/Ag/D_2/Ag/D_3$ structure, where $D_2$ comprises at least one thermochromic layer comprising vanadium oxide.

21. The glazing according to claim 19, wherein the dielectric is at least one selected from the group consisting of metal oxides, nitrides, silicon oxides, silicon oxycarbides and silicon oxynitrides.

22. The glazing according to claim 21, wherein the metal oxides are selected from the group consisting of ZnO, $TiO_2$, $SnO_2$, $Nb_2O_5$ and $Ta_2O_5$, and the nitrides are selected from the group consisting of AlN and $Si_3N_4$.

23. The glazing according to claim 3, wherein the layer(s) (2) having optical properties comprises a dielectric that is at least one selected from the group consisting of metal oxides, nitrides, silicon oxides, silicon oxycarbides and silicon oxynitrides.

24. The glazing according to claim 23, wherein the metal oxides are selected from the group consisting of ZnO, $TiO_2$, $SnO_2$, $Nb_2O_5$ and $Ta_2O_5$, and the nitrides are selected from the group consisting of AlN and $Si_3N_4$.

25. The glazing according to claim 1, wherein the layer(s) (2) has (have) electrical conduction properties.

26. The glazing according to claim 25, wherein the layer(s) (2) comprises a metal or a transparent conducting oxide selected from the group consisting of tin-doped indium oxide ITO, doped zinc oxide and doped tin oxide.

27. The glazing according to claim 1, wherein the layer(s) (2) has (have) electrical conduction properties, and wherein at least one of said layer(s) (2) is provided with connection means to an electrical supply.

28. The glazing according to claim 27, which contains a substrate, and wherein said at least one of said layer(s) (2) is placed on one face, and the layer(s) (1) having thermochromic properties on the other face, of the same substrate, or both on the same face of said substrate.

29. The glazing according to claim 1, which contains one or more substrates, and wherein the layer(s) (2) has (have) thermal properties, and wherein the layer(s) (1) comprising vanadium oxide are placed on one face, and the layer(s) (2) having thermal properties are placed on the other face, of the same substrate, or the layer(s) (1) comprising vanadium oxide are placed on one face of a first substrate and the layer(s) (2) having thermal properties are placed on one face of a second substrate.

30. The glazing according to claim 1, wherein it comprises one or more rigid or semi-rigid substrates.

31. The glazing according to claim 30, wherein the one or more rigid or semi-rigid substrates comprises a material selected from the group consisting of glass, polycarbonate PC, polyvinyl chloride PVC and polymethyl methacrylate PMMA.

32. The glazing according to claim 1, wherein it comprises a monolithic glazing, a laminated glazing, an insulated double-glazing or an insulated triple-glazing.

33. The glazing according to claim 1, wherein it has solar control properties, with a reduction in its energy transmission $\Delta T_E$ of at least 5%, a reduction in its light transmission $\Delta T_L$ of at least 5%, and an increase in its light reflection $\Delta R_L$ of at least 10%, when it goes from a temperature below the switch temperature $T_s$ of the vanadium oxide to a temperature above said temperature $T_s$.

34. The glazing according to claim 1, wherein it has solar control properties with a $T_L$ (cold)/$T_E$ (hot) ratio of greater than or equal to 2, wherein $T_L$ (cold) is the light transmission below the switch temperature $T_s$ of the vanadium oxide and $T_E$ (hot) is the energy transmission above said temperature $T_s$.

35. A process for obtaining the glazing according to claim 1, comprising vacuum depositing at least layer(s) (1).

36. The process according to claim 35, comprising vacuum depositing layer(s) (1) and layer(s) (2).

37. The process according to claim 36, wherein at least one of said layer(s) vacuum deposited is vacuum deposited by sputtering.

38. A method comprising switching the at least one layer having thermochromic properties of the glazing according to claim 27 by said electrical supply.

* * * * *